(12) United States Patent
Dembinski et al.

(10) Patent No.: US 11,022,033 B2
(45) Date of Patent: Jun. 1, 2021

(54) INTERNAL COMBUSTION ENGINE FOR A MOTOR VEHICLE, IN PARTICULAR FOR A CAR

(71) Applicant: Bayerische Motoren Werke Aktiengesellschaft, Munich (DE)

(72) Inventors: Norbert Dembinski, Munich (DE); Attila Solymosi, Munich (DE); Thomas Spiess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/556,754

(22) Filed: Aug. 30, 2019

(65) Prior Publication Data

US 2019/0383214 A1    Dec. 19, 2019

Related U.S. Application Data

(63) Continuation of application No. PCT/EP2018/054847, filed on Feb. 27, 2018.

(30) Foreign Application Priority Data

Mar. 1, 2017   (DE) .................. 10 2017 203 295

(51) Int. Cl.
   *F02B 67/06*    (2006.01)
   *F02B 39/04*    (2006.01)
   *F16H 7/20*     (2006.01)

(52) U.S. Cl.
   CPC .............. *F02B 67/06* (2013.01); *F02B 39/04* (2013.01); *F16H 7/20* (2013.01)

(58) Field of Classification Search
   CPC .......... F02B 67/06; F02B 67/04; F02B 39/04; F02B 77/081; F02B 2275/06;
   (Continued)

(56) References Cited

U.S. PATENT DOCUMENTS

| | | | | |
|---|---|---|---|---|
| 3,601,100 A | * | 8/1971 | Louckes | ................. F01P 7/042 |
| | | | | 123/41.12 |
| 4,878,360 A | * | 11/1989 | Viegas | ................. B60H 1/3226 |
| | | | | 62/239 |

(Continued)

FOREIGN PATENT DOCUMENTS

| | | |
|---|---|---|
| CN | 201050403 Y | 4/2008 |
| CN | 201155363 Y | 11/2008 |

(Continued)

OTHER PUBLICATIONS

PCT/EP2018/054847, International Search Report dated Apr. 30, 2018 (Three (3) pages).

(Continued)

*Primary Examiner* — Grant Moubry
(74) *Attorney, Agent, or Firm* — Crowell & Moring LLP

(57) ABSTRACT

An internal combustion engine includes an output shaft, fan, auxiliary unit, and wraparound drive. The drive has a first wraparound wheel which is drivable by the output shaft and a first wraparound belt which wraps around the first wraparound wheel, which is drivable by the output shaft via the first wraparound wheel, and via which the auxiliary unit is drivable by the output shaft. The drive has a second wraparound wheel, a third wraparound wheel, a second wraparound belt which wraps around the first wraparound wheel and the second wraparound wheel where the second wraparound wheel is drivable by the output shaft via the second wraparound belt and the first wraparound wheel, and a third wraparound belt which wraps around the second wraparound wheel and the third wraparound wheel such that the fan is drivable by the second wraparound wheel via the third wraparound wheel and the third wraparound belt.

10 Claims, 6 Drawing Sheets

(58) Field of Classification Search
CPC .......... F02B 2275/08; F16H 7/20; F16H 7/08; F16H 7/02
See application file for complete search history.

(56) References Cited

U.S. PATENT DOCUMENTS

| | | | |
|---|---|---|---|
| 5,203,293 A | 4/1993 | Shintani et al. | |
| 7,216,621 B2* | 5/2007 | Pigott | F02B 67/06 123/195 A |
| 7,367,916 B2* | 5/2008 | Wimmer | F01P 5/12 123/198 R |
| 8,408,188 B1 | 4/2013 | Hormilla | |
| 9,328,806 B2* | 5/2016 | Noguchi | F16H 7/1281 |
| 9,683,486 B2* | 6/2017 | Eisterlehner | F02B 67/06 |
| 2002/0182063 A1* | 12/2002 | Edsinger | F04D 17/10 415/124.1 |
| 2009/0298646 A1 | 12/2009 | Parsons | |
| 2016/0024991 A1* | 1/2016 | Smemo | F01P 5/043 474/4 |

FOREIGN PATENT DOCUMENTS

| | | |
|---|---|---|
| CN | 104350256 A | 2/2015 |
| DE | 28 46 775 A1 | 5/1979 |
| DE | 41 21 263 A1 | 1/1992 |
| DE | 10 2010 005 423 B4 | 9/2011 |
| DE | 10 2011 104 932 A1 | 12/2012 |
| EP | 0 052 527 A1 | 5/1982 |
| GB | 2 006 876 A | 5/1979 |
| WO | WO 2012/075987 A1 | 6/2012 |

OTHER PUBLICATIONS

German Search Report issued in German counterpart application No. 10 2017 203 295.2 dated Nov. 17, 2017 (Nine (9) pages).

Chinese Office Action issued in Chinese application No. 201880012996.4 dated Dec. 3, 2020, with English translation (Nineteen (19) pages).

* cited by examiner

INTERNAL COMBUSTION ENGINE FOR A MOTOR VEHICLE, IN PARTICULAR FOR A CAR

CROSS REFERENCE TO RELATED APPLICATIONS

This application is a continuation of PCT International Application No. PCT/EP2018/054847, filed Feb. 27, 2018, which claims priority under 35 U.S.C. § 119 from German Patent Application No. 10 2017 203 295.2, filed Mar. 1, 2017, the entire disclosures of which are herein expressly incorporated by reference.

BACKGROUND AND SUMMARY OF THE INVENTION

The invention relates to an internal combustion engine for a motor vehicle, in particular for a car.

Internal combustion engines of this type for motor vehicles, in particular for cars such as passenger cars, are already well known from the general prior art. The respective internal combustion engine has an output shaft which is configured, for example, as a crankshaft and via which the internal combustion engine can provide, for example, torques for driving the motor vehicle. Furthermore, the internal combustion engine has a fan and at least one auxiliary unit which is different than the fan and can be driven, for example, by the output shaft. Moreover, the internal combustion engine has a wraparound drive which has at least one wraparound wheel which can be driven by the output shaft and at least one wraparound means which wraps around the wraparound wheel at least partially, can be driven by the output shaft via the wraparound wheel, and via which at least the auxiliary unit can be driven by the output shaft.

The wraparound wheel is also called a wheel or drive wheel, for example. It can be provided, in particular, that the wraparound drive is configured as a belt drive, with the result that the wraparound means is configured as a belt, for example. Here, the wraparound wheel is configured as a pulley wheel.

It is an object of the present invention to develop an internal combustion engine of the type mentioned at the outset, in such a way that the fan can be driven particularly advantageously.

The internal combustion engine according to the invention for a motor vehicle, in particular for a car such as a passenger car, has an output shaft, a fan, at least one auxiliary unit which is different than the fan, and a wraparound drive which has at least one wraparound wheel which can be driven by the output shaft and at least one wraparound means which wraps around the wraparound wheel, can be driven by the output shaft via the wraparound wheel, and via which at least the auxiliary unit can be driven by the output shaft.

In order for it then to be possible for a particularly advantageous drive of the fan which is preferably configured as a viscous fan to be realized, a second wraparound wheel, a third wraparound wheel, a second wraparound means and a third wraparound means are provided according to the invention. The second wraparound means wraps around the first wraparound wheel and the second wraparound wheel in each case at least partially, it being possible for the second wraparound wheel to be driven by the output shaft via the second wraparound means and the first wraparound wheel. The third wraparound means wraps around the second wraparound wheel and the third wraparound wheel in each case at least partially, with the result that the fan can be driven by the second wraparound wheel via the third wraparound wheel and the third wraparound means. The fan, in particular at least one fan impeller of the fan, can therefore be driven by the output shaft which is configured, for example, as a crankshaft, in particular can be driven mechanically, via the third wraparound wheel, the third wraparound means, the second wraparound wheel, the second wraparound means and the first wraparound wheel.

The invention is based on the finding that the fan which is preferably configured as a viscous fan usually can be driven or is driven in a corresponding unit group by means of the same wraparound means which is configured, for example, as a belt, in the case of conventional internal combustion engines, by means of which wraparound means the auxiliary unit which is configured, for example, as a water pump can also be driven or is also driven. It can be provided here, in particular, that the water pump or a pump element of the water pump which is configured for conveying a liquid, in particular water, and the fan, in particular the abovementioned fan impeller of the fan, are driven or can be driven via the same shaft by the same wraparound means and via the latter by the output shaft. To this end, for example, the fan is coupled, in particular rigidly, to the shaft of the water pump, the fan being screwed to the shaft, for example. As a result, merely a rigid transmission can be realized, in particular between the water pump and the fan. Furthermore, the positioning of the fan is dependent on the positioning of the water pump. The fan is used, in particular, to generate an air flow which acts, in particular, as a cooling air flow, and to supply a cooling module with the air flow, for example. Since the position of the fan is dependent on the position of the water pump, the position of the fan cannot be adapted to the cooling module or can be adapted to it only in a compromised manner. Furthermore, in particular, the fan cannot be adapted with regard to its positioning to specific vehicle variants, which is disadvantageous, in particular, with regard to the generation of sufficient freedom of movement on the water in the case of all-terrain vehicles or with regard to sports car applications.

The problems and disadvantages can then be avoided in the case of the internal combustion engine according to the invention, since the fan can be driven particularly advantageously via the second wraparound means and the third wraparound means. For example, the second wraparound wheel, the third wraparound wheel, the second wraparound means and the third wraparound means are constituent parts of an auxiliary drive, via which the fan can be driven particularly advantageously. In particular, the auxiliary drive makes it possible for a particularly advantageous transmission for driving the fan to be realized, with the result that, for example, a rigid coupling of the transmission, via which the fan can be driven, to a water pump or another auxiliary unit can be avoided. Furthermore, in comparison with conventional internal combustion engines, the water pump can be relieved in terms of power output, with the result that, for example, inexpensive and low weight bearings of the water pump can be used simply.

A further advantage of the internal combustion engine according to the invention is that, for example, a basic drive, via which the auxiliary unit can be driven by the output shaft, can remain structurally unchanged, in particular in the case of the production of different vehicle variants. Here, for example, the auxiliary drive forms an additional solution to the basic drive, with the result that a building block character of the internal combustion engine can be produced. Within the context of the building block character, the basic drive and the auxiliary drive represent building block elements which can be combined particularly advantageously. Moreover, it can be avoided that the basic drive is additionally loaded with power output for driving the fan, with the result that retesting and structural modifications of the basic drive can be avoided. In particular, it is possible, in the case of corresponding design variants of the motor vehicle, for the fan and therefore the auxiliary drive to be dispensed with simply, with the result that different design variants or derivatives of the motor vehicle can be produced in a simple and inexpensive way.

Furthermore, the advantage can be realized that the fan can be arranged particularly advantageously, in particular in relation to the remaining customary internal combustion engine and/or in relation to at least one cooling module, with the result that, for example, a position of the fan can be selected at least substantially freely. In this way, the fan can be adapted in a particularly flexible and appropriate manner to different vehicle variants, in particular with regard to its positioning, since the fan no longer has to be anchored in the basic drive and, for example, on the water pump in the process.

In one advantageous refinement of the invention, a bracket is provided which is held on a housing element of the internal combustion engine and on which the second wraparound wheel and the third wraparound wheel are held rotatably. The housing element is, for example, an engine housing, in particular a crankcase, of the internal combustion engine, the output shaft being mounted, for example, rotatably on the housing element. As a result of the use of the bracket, a particularly simple and modular use and positioning of the auxiliary drive and therefore of the fan can be realized.

It is preferably provided that the fan, in particular its impeller wheel, is held or mounted rotatably on the bracket. For example, the fan impeller is held rotatably on the bracket via a shaft, by which the fan impeller can be driven or to which, for example, the third wraparound wheel is connected fixedly so as to rotate with it.

It has been shown to be particularly advantageous here if the bracket has at least one carrying arm, on which the third wraparound wheel is held or mounted rotatably. Here, the carrying arm penetrates a first through opening which is delimited by way of the second wraparound means and a second through opening which is delimited by way of the third wraparound means, with the result that the installation space requirement of the internal combustion engine can be kept particularly low. The second and third wraparound means form, for example, an endless loop which wraps around the respective wraparound wheels in each case at least partially. Here, the respective endless loop forms or delimits the respective through opening which is penetrated by the carrying arm.

In one particularly advantageous embodiment of the invention, an auxiliary unit is provided which is different than the auxiliary unit and the fan, is provided in addition to them, and can be driven by the second wraparound wheel. As a result, an integration of the second auxiliary unit into the internal combustion engine can be realized, which integration is particularly simple, inexpensive and favorable in terms of installation space.

It has been shown to be particularly advantageous here if the second auxiliary unit is held on the bracket. As a result, a drive of the second auxiliary unit, which drive is at least virtually free from transverse forces, can be realized, in particular via the auxiliary drive. A building block character can be realized with regard to this, for example, with the result that the internal combustion engine can be equipped with the second auxiliary unit in a simple and appropriate way, or the second auxiliary unit can be simply dispensed with, in particular without the basic drive and the auxiliary drive being influenced structurally.

A clutch is preferably provided, via which the second auxiliary unit can be driven by the second wraparound wheel. The clutch is, for example, a positively locking clutch and is configured, in particular, as a dog clutch. The clutch can be switched over, in particular, between at least one coupling state and at least one decoupling state. In the coupling state, the second auxiliary unit is coupled to the second wraparound wheel via the clutch, in particular fixedly so as to rotate with the second wraparound wheel, as a result of which the second auxiliary unit can be driven by the second wraparound wheel via the clutch. In the decoupling state, however, the second auxiliary unit is decoupled from the second wraparound wheel, with the result that the second auxiliary unit cannot be driven by the second wraparound wheel via the clutch. As a result, the second auxiliary unit can be switched on and off appropriately and in a simple way, and can be driven particularly efficiently.

A further embodiment is distinguished by the fact that the second auxiliary unit is configured as a liquid pump. In particular, the second auxiliary unit is, for example, what is known as a hydraulic pump, by means of which a hydraulic liquid can be conveyed. The hydraulic liquid is used, for example, to actuate at least one hydraulically actuable actuator, in particular of a transmission of the motor vehicle. The hydraulic liquid is, for example, a liquid which is different than water, and can be configured here as oil.

In the case of one particularly advantageous embodiment of the invention, the second wraparound wheel and/or the third wraparound wheel have/has a turret tensioning system for tensioning the respective wraparound means. A turret tensioning system of this type, and its function in particular, is known, for example, from DE 10 2010 005 423 B4, the full scope of the disclosure and content of which is to be considered to be part of this present disclosure.

A further embodiment is distinguished by the fact that the first wraparound means is arranged in a first plane, the second wraparound means is arranged in a second plane which is spaced apart from the first plane, and the third wraparound means is arranged in a third plane which is spaced apart from the first plane and from the second plane, the first plane running at least partially between the second plane and the third plane. As a result, the installation space requirement can be kept particularly low.

In a further refinement of the invention, the first auxiliary unit is configured as a coolant pump, in particular as a cooling liquid pump, by means of which, for example, a cooling medium which is different than the abovementioned hydraulic liquid, in particular a cooling liquid, can be conveyed. The cooling liquid is also called cooling water or simply water, with the result that, for example, the first auxiliary unit is configured as the abovementioned water pump.

Finally, it has been shown to be particularly advantageous if a third auxiliary unit, in particular an electric machine, is provided which can be driven by the output shaft via the first wraparound means and the first wraparound wheel. The first auxiliary unit and the third auxiliary unit can therefore be driven, for example, by the abovementioned basic drive or via the basic drive by the output shaft, the basic drive comprising, for example, the first wraparound means and the first wraparound wheel. Furthermore, for example, the first wraparound wheel also belongs to the auxiliary drive which is also called an ancillary drive, since the fan and the second auxiliary unit which is provided, for example, can be driven by the output shaft via the first wraparound wheel.

Further details of the invention result from the following description of preferred exemplary embodiments with the associated drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or functionally identical elements are provided with identical designations in the figures.

Figure 1:
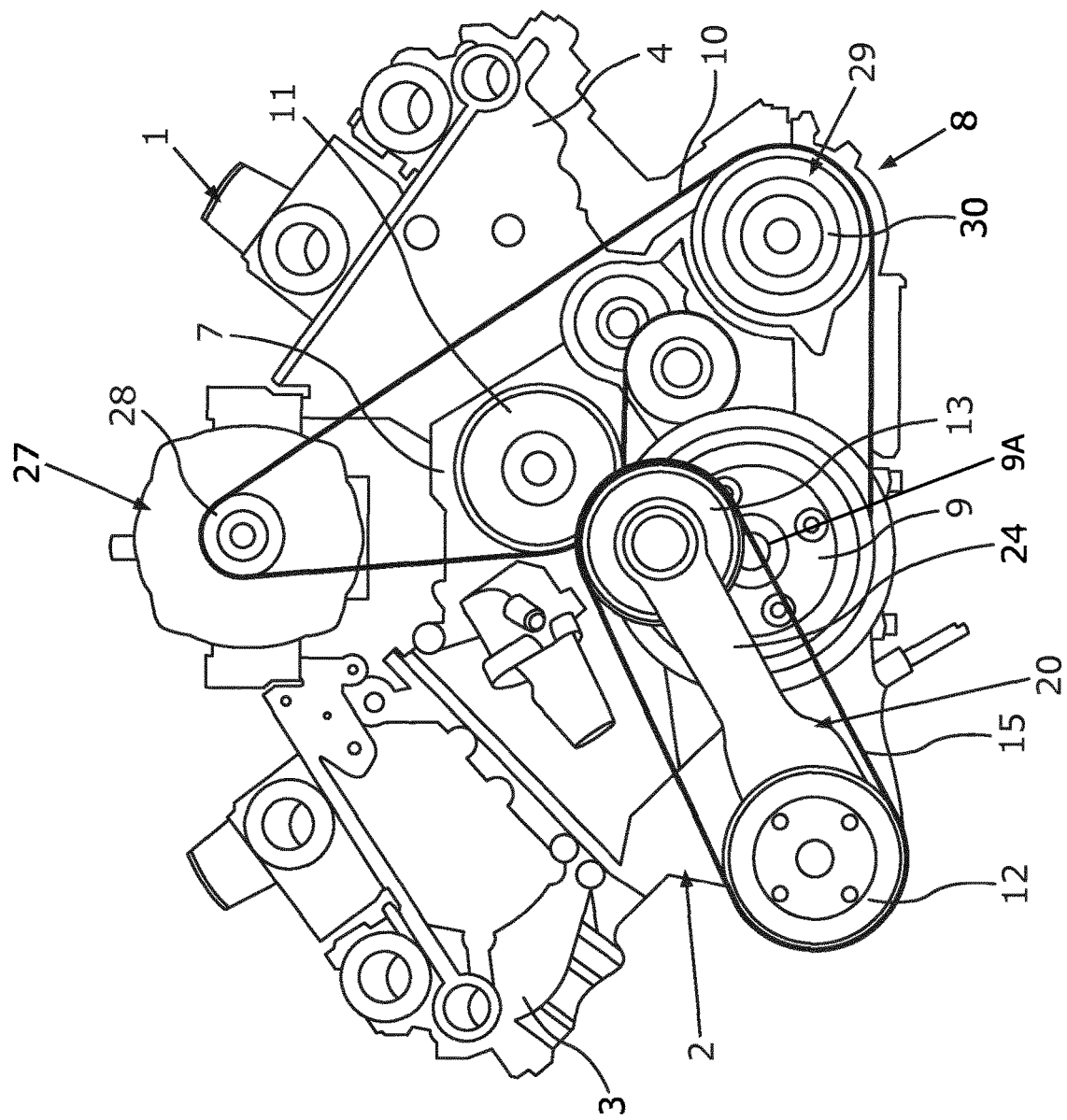
FIG. 1 shows a diagrammatic front view of an internal combustion engine in accordance with a first embodiment for a motor vehicle, having a basic drive for driving at least two auxiliary units, and having an auxiliary drive for driving a fan, the auxiliary drive having at least two wraparound wheels and at least two wraparound means.

FIG. 1 shows a diagrammatic front view of an internal combustion engine which is denoted overall by 1 in accordance with a first embodiment for a motor vehicle, in particular for a car such as a passenger car. Here, the motor vehicle can be driven by the internal combustion engine 1. The internal combustion engine 1 is configured as a reciprocating piston internal combustion engine. As can be seen from FIG. 1, the internal combustion engine is configured in a V-design, furthermore. Here, the internal combustion engine 1 has at least one housing element which is configured as an engine housing 2, is configured, for example, as a crankcase, in particular as a cylinder crankcase, or comprises at least one crankcase of this type, in particular at least one cylinder crankcase of this type. The housing element (engine housing 2) forms, for example, a plurality of combustion chambers of the internal combustion engine 1, the combustion chambers being configured, for example, as cylinders. Here, for example, two cylinder banks are formed by way of the engine housing 2, the respective cylinder bank having a plurality of cylinders which are arranged in line. The respective cylinder has, for example, a center axis which is also called a cylinder axis. Furthermore, the internal combustion engine 1 has at least one cylinder head 3 or 4 per cylinder bank, which cylinder head 3 or 4 is connected to the engine housing 2.

Furthermore, the internal combustion engine 1 has an output shaft 9A which is configured as a crankshaft. Here, the output shaft 9A is mounted rotatably on the engine housing 2 and can therefore be rotated about a rotational axis relative to the engine housing 2. Via the output shaft 9A which is preferably configured as a crankshaft, the internal combustion engine 1 can provide torques for driving the motor vehicle.

Figure 6:
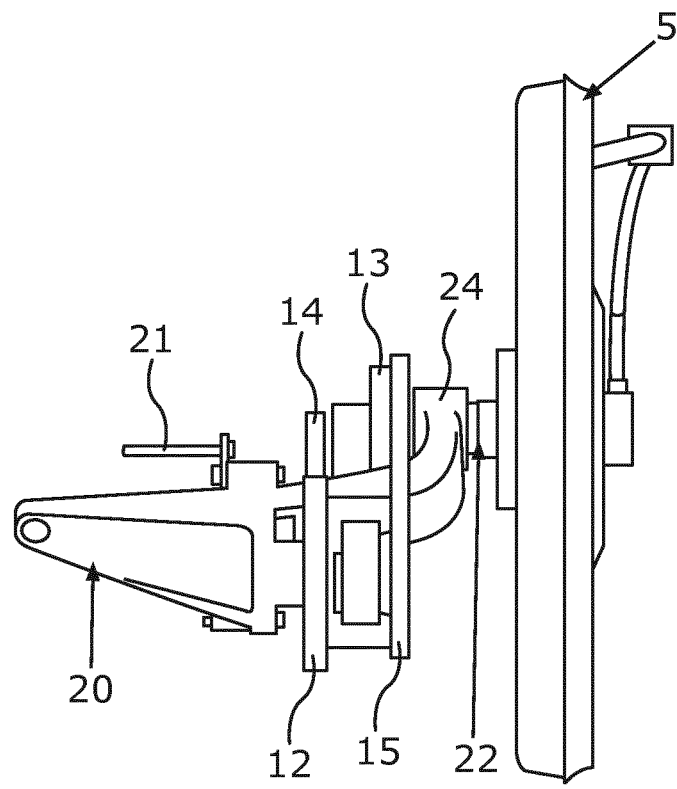
FIG. 6 shows a diagrammatic side view of the auxiliary drive and the fan.
Figure 7:
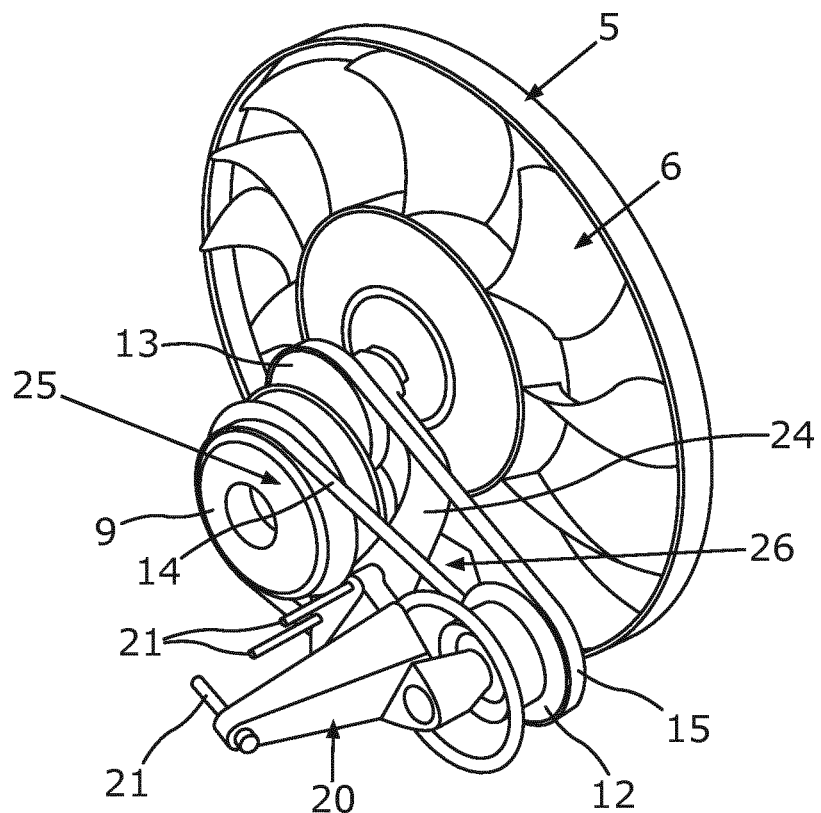
FIG. 7 shows a diagrammatic and perspective rear view of the auxiliary drive and the fan.

As can be seen from a combination with FIGS. 6 and 7, the internal combustion engine 1 comprises a fan 5 which is configured as a viscous fan. As will be described more precisely in the following text, the fan 5, in particular its fan impeller 6, can be driven by the output shaft and, as a result, can be rotated about the rotational axis relative to the engine housing 2. By way of rotation of the fan impeller 6, an air flow which acts as a cooling air flow is generated or conveyed by means of the fan impeller 6. For example, a cooling module (not shown in the figures) of the motor vehicle can be supplied with the air flow, since the air flow can flow around the cooling module. Therefore, the cooling module can be flowed around by the air flow which is generated by means of the fan 5. Furthermore, the cooling module can be flowed through by a coolant which is configured, for example, as a cooling liquid and is also called water or cooling water. The coolant can also flow through the internal combustion engine 1, in particular the engine housing 2 and/or the respective cylinder head 3 or 4, as a result of which the engine housing 2 and/or the respective cylinder head 3 or 4 is cooled. As a result, the coolant is heated which can subsequently flow through the cooling module. The heated coolant can be cooled by means of the cooling module by it being possible for a thermal transfer from the coolant to the air flow which flows around the cooling module to take place via the cooling module.

The feature that the fan 5 is configured as a viscous fan is to be understood to mean that the fan 5 functions in the manner of a viscous clutch. Here, the fan 5 comprises, for example, the fan impeller 6 and a driver plate which can be driven by the output shaft, as will be described more precisely in the following text. The driver plate is received, for example, in a working space which is formed at least partially, for example, by a housing of the fan 5. The housing is, for example, connected fixedly to the fan impeller 6 so as to rotate with it, in particular is formed by way of the fan impeller 6. By way of the introduction of a viscous liquid into the working space, the driver plate is coupled via the viscous liquid to the housing as in the case of a viscous clutch, as a result of which the housing and therefore the fan impeller 6 are driven or can be driven via the viscous liquid by the driver plate and via the latter by the output shaft. If, however, the viscous liquid is discharged from the working space, in particular at least predominantly or completely, the housing and therefore the fan impeller 6 are decoupled from the driver plate, with the result that the driver plate and therefore the output shaft cannot drive the fan impeller 6. The feed and discharge of viscous liquid into and respectively from the working space is controlled or respectively regulated, for example, by means of a bimetallic strip, the bimetallic strip deforming correspondingly in a manner which is dependent on a temperature, in particular of the cooling module and/or the internal combustion engine 1. As a result of the deformation of the bimetallic strip, the feed and discharge of the viscous liquid into and respectively from the working space is set.

Figure 2:
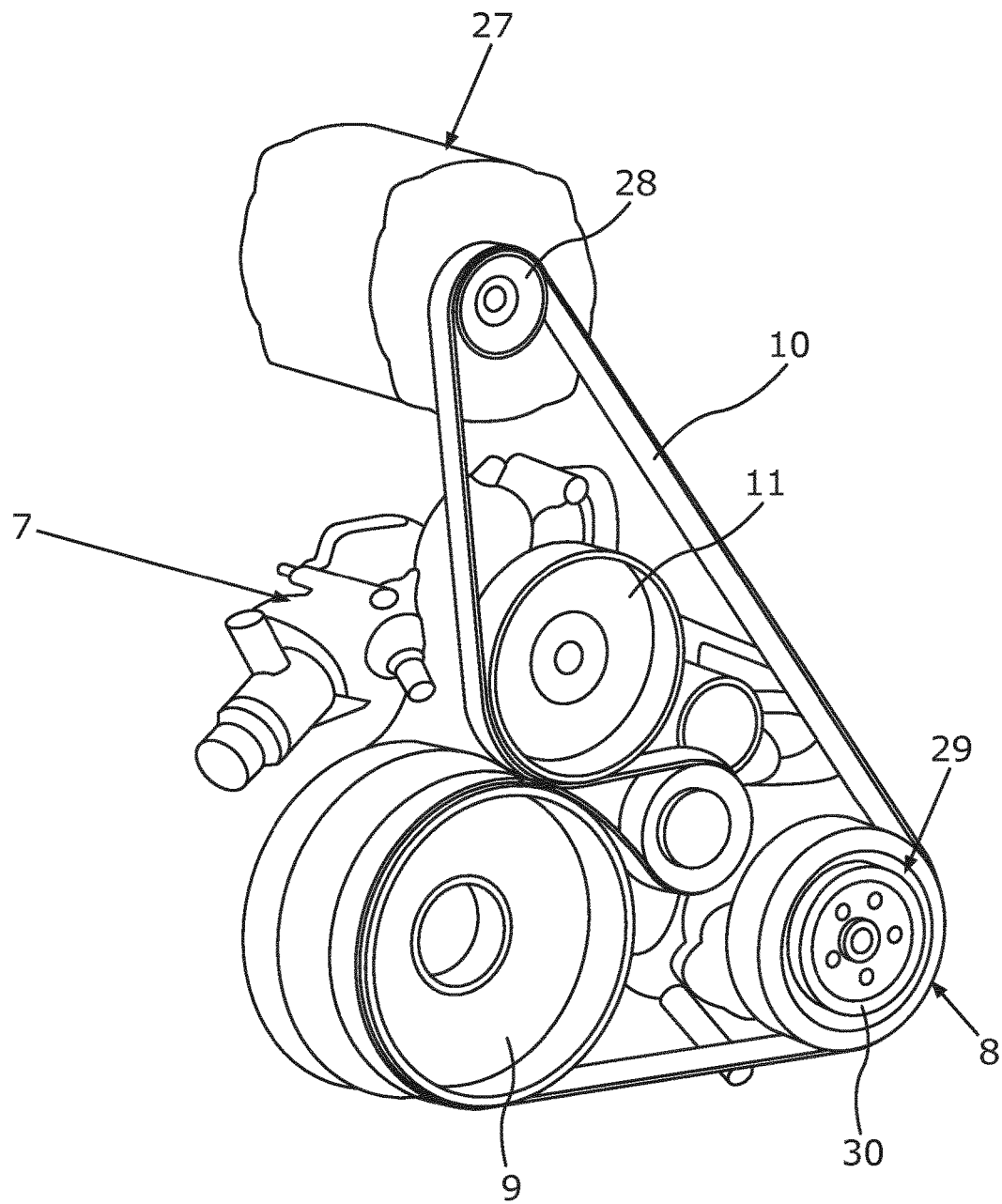
FIG. 2 shows a diagrammatic and perspective front view of the basic drive.

Moreover, the internal combustion engine 1 has a first auxiliary unit which is different than the fan 5 and is provided in addition to the latter, in the form of a coolant pump 7 which can be seen particularly clearly from FIG. 2 and by means of which the abovementioned coolant can be conveyed. Since the coolant is also called cooling water or water, the coolant pump 7 is also called a water pump.

Moreover, the internal combustion engine 1 comprises a wraparound drive 8 which is configured, for example, as a belt drive. The wraparound drive 8 has at least one first wraparound wheel which can be driven by the output shaft 9A, in the form of a pulley wheel 9 which is, for example, connected fixedly to the output shaft 9A so as to rotate with it. In particular, the pulley wheel 9 is screwed to the output shaft 9A, for example. Moreover, the wraparound drive 8 comprises at least one first wraparound means in the form of a first belt 10 which wraps around the pulley wheel 9 at least partially and can therefore be driven by the output shaft 9A via the pulley wheel 9. Furthermore, the coolant pump 7 can be driven by the belt 10 and therefore by the output shaft 9A via the belt 10 and the pulley wheel 9. The coolant pump 7 has, for example, at least one pump element which cannot be seen in greater detail in the figures and can be rotated about a rotational axis. By way of rotation of the pump element about the associated rotational axis, the coolant is conveyed by means of the pump element. The pump element is, for example, connected fixedly to a shaft so as to rotate with it. Here, the wraparound drive 8 comprises a wraparound wheel which is configured in the present case as a pulley wheel 11 and by which, for example, the shaft and therefore the pump element can be driven. In particular, for example, the pulley wheel 11 is connected fixedly to the shaft so as to rotate with it. Here, the belt 10 wraps around the pulley wheel 11 at least partially, with the result that the pump element can be driven by the output shaft 9A via the shaft, the pulley wheel 11, the belt 10 and the pulley wheel 9.

In order for it then to be possible for a particularly advantageous drive of the fan 5, in particular of the fan impeller 6, to be realized, the internal combustion engine 1 comprises a second wraparound wheel (can be seen particularly clearly from FIG. 3) in the form of a pulley wheel 12, a third wraparound wheel in the form of a pulley wheel 13, a second wraparound means in the form of a belt 14, and a third wraparound means in the form of a belt 15. The belts 14 and 15 are preferably configured as elastic belts. Here, for example, the belts 14 and 15 and the pulley wheels 12 and 13 are constituent parts of an auxiliary drive which is also called an ancillary drive and, for example, also comprises the pulley wheel 9. Here, for example, the wraparound drive 8 is a basic drive which comprises the belt 10, the pulley wheel 11 and also the pulley wheel 9. Therefore, for example, the pulley wheel 9 is assigned both to the basic drive and the auxiliary drive, via which the fan 5 or the fan impeller 6 can be driven.

The belt 14 wraps around the pulley wheel 9 and the pulley wheel 12 in each case at least partially, with the result that the pulley wheel 12 can be driven by the output shaft via the belt 14 and the pulley wheel 9. Moreover, the belt 15 wraps around the pulley wheel 12 and the pulley wheel 13 in each case at least partially, with the result that the fan 5 can be driven by the pulley wheel 12 via the pulley wheel 13 and the belt 15. Overall, the fan 5, in particular the fan impeller 6, can therefore be driven by the output shaft via the pulley wheel 13, the belt 15, the pulley wheel 12, the belt 14 and the pulley wheel 9. As can be seen particularly clearly from FIG. 4, the belt 10 wraps around a first wraparound region 16 of the pulley wheel 9 at least partially, the belt 14 wrapping around a second wraparound region 17 of the pulley wheel 9 at least partially. Here, the wraparound regions 16 and 17 are arranged behind one another or so as to follow one another in the axial direction of the pulley wheel 9. In a corresponding manner to this, the belt 14 wraps around a third wraparound region 18 of the pulley wheel 12, the belt 15 wrapping around a fourth wraparound region 19 of the pulley wheel 12. Here, the wraparound regions 18 and 19 are arranged behind one another or so as to follow one another in the axial direction of the pulley wheel 12.

The wraparound regions 16 and 17 are preferably configured in one piece with one another, but might also as an alternative be formed by way of individual components which are configured separately from one another and, for example, are connected to one another, in particular fixedly so as to rotate together. The wraparound regions 18 and 19 are preferably configured in one piece with one another, but might also as an alternative be formed by way of individual components which are configured separately from one another and, for example, are connected to one another, in particular fixedly so as to rotate together.

It can be seen overall that the fan 5 can be driven by the output shaft via the auxiliary drive, with the result that a rigid transmission coupling to the water pump (coolant pump 7) can be avoided. Furthermore, the fan 5 can be arranged appropriately and can therefore be positioned particularly advantageously relative to the cooling module, with the result that effective cooling can be produced.

Figure 3:
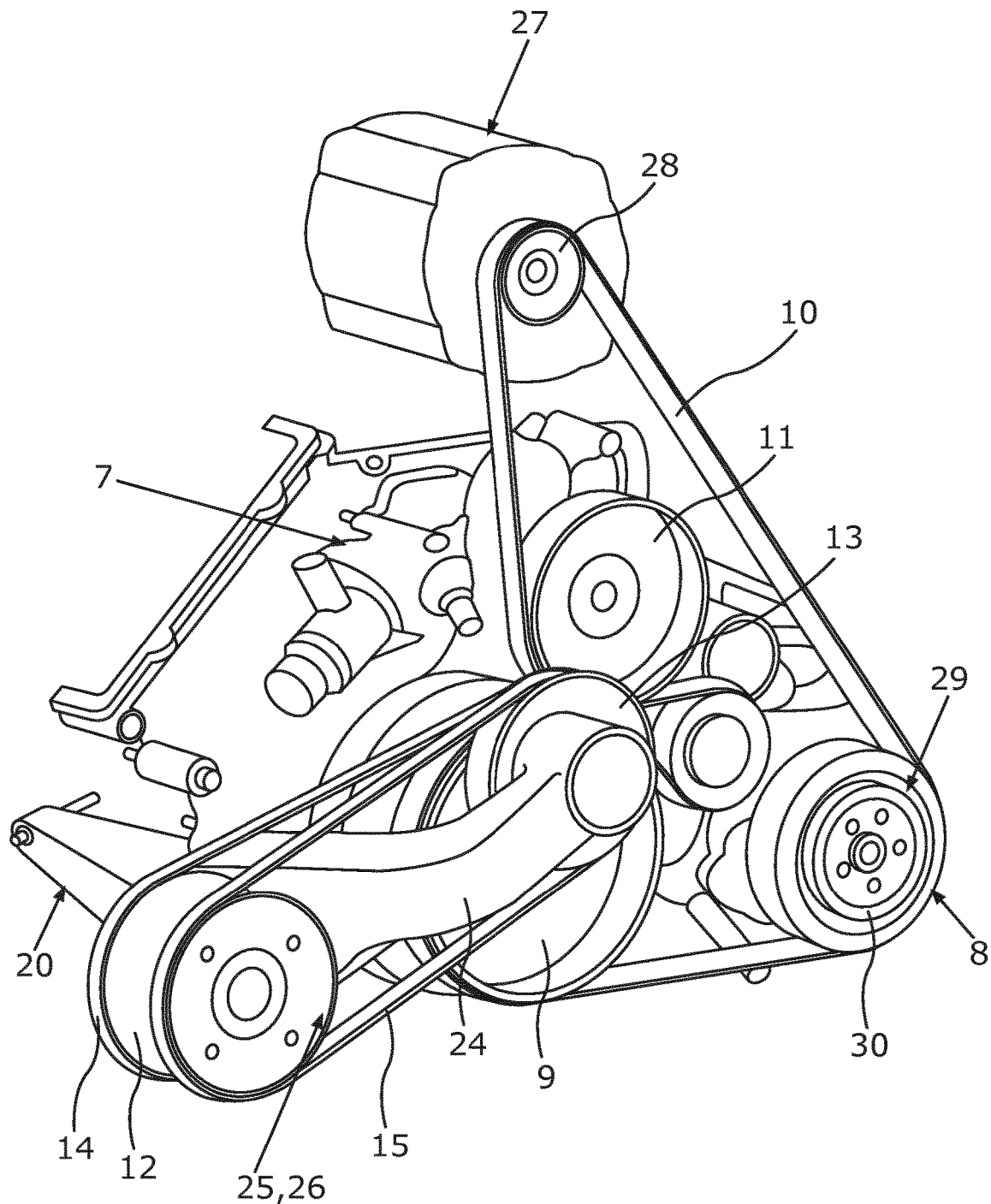
FIG. 3 shows a diagrammatic and perspective front view of the basic drive and the auxiliary drive.

The wraparound drive 8 which is configured or acts as a basic drive can be seen particularly clearly from FIG. 2. FIG. 3 shows the basic drive and the auxiliary drive. As can be seen from FIGS. 2 and 3, the internal combustion engine 1 or the basic drive can be augmented by the auxiliary drive in a particularly simple and modular way, with the result that a building block character can be realized.

Figure 4:
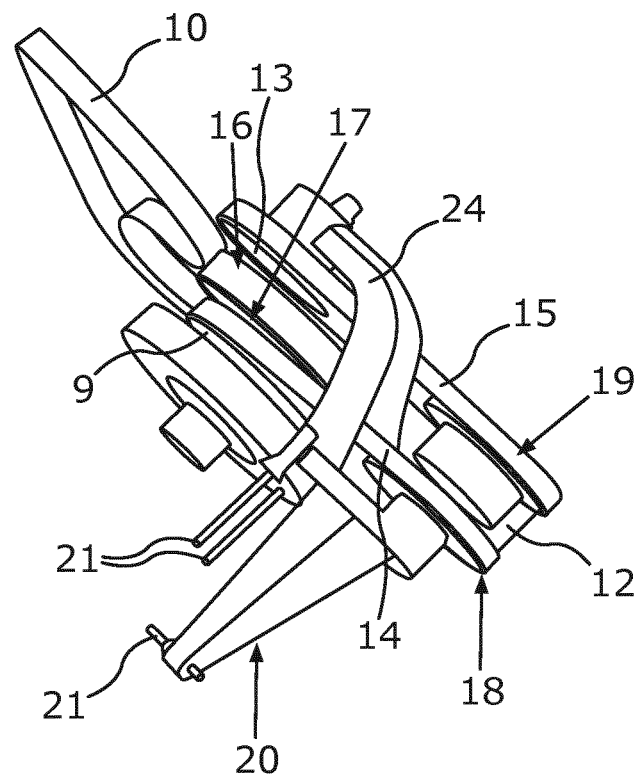
FIG. 4 shows a diagrammatic and perspective plan view of the auxiliary drive.
Figure 5:
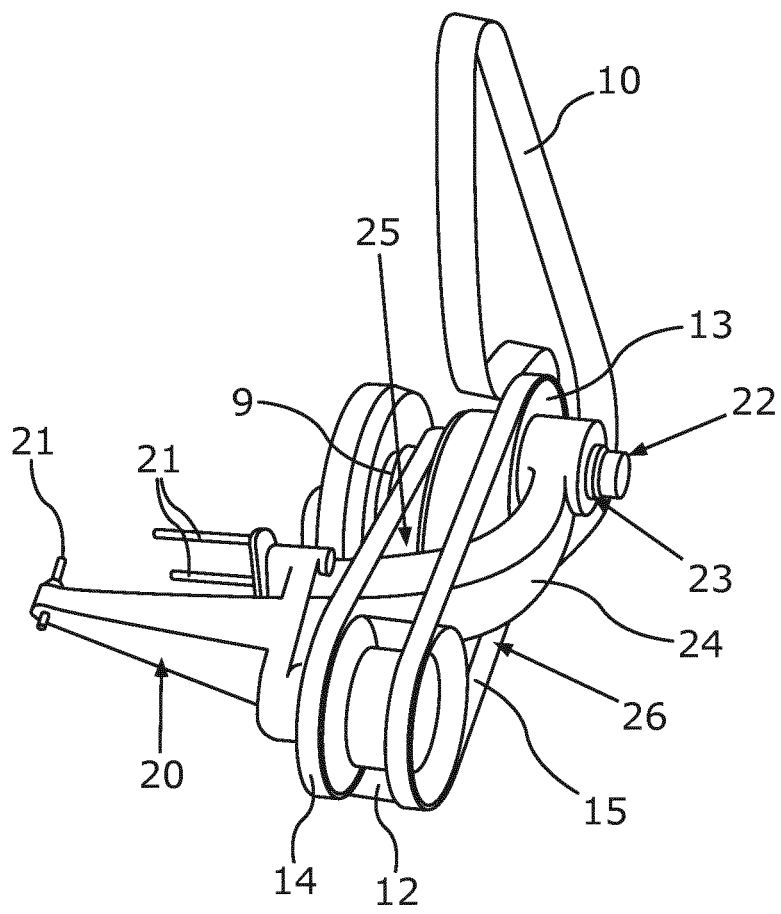
FIG. 5 shows a diagrammatic and perspective side view of the auxiliary drive.

Furthermore, the internal combustion engine 1 has a bracket 20 which can be seen particularly clearly from FIGS. 3 to 5 and can be configured in one piece, for example. The bracket 20 is preferably held or fastened on the engine housing 2. It is possible, in particular, that the bracket 20 is screwed to the engine housing 2, for example by means of screws 21 which can be seen particularly clearly in FIGS. 4 and 5, and is fastened to the engine housing 2 as a result. Here, the pulley wheels 12 and 13 are held or mounted rotatably on the bracket 20. It is conceivable, in particular, that the fan 5, in particular the fan impeller 6, is mounted rotatably on the bracket 20. To this end, for example, a shaft 22 is provided which can be seen from FIG. 5, is received at least partially in a corresponding receptacle 23 of the bracket 20, which receptacle 23 is configured, for example, as a through opening, and is mounted rotatably on the bracket 20 in the receptacle 23. Here, for example, the shaft 22 can be driven by the pulley wheel 13. In particular, the pulley wheel 13 is connected fixedly to the shaft 22 so as to rotate with it.

The fan impeller 6 can be driven by the shaft 22 in the described way. For example, the abovementioned driver plate can be driven by the shaft 22 or is connected fixedly to the shaft 22 so as to rotate with it. For example, the housing and therefore the fan impeller 6 are mounted rotatably on the shaft 22 and are therefore mounted via the shaft 22 on the bracket 20. Whereas, for example, the fan impeller 6 or the fan 5 is arranged in the axial direction of the pulley wheel 13 on a first side of the bracket 20, which side faces away from the engine housing 2 in the axial direction of the pulley wheel 13, the pulley wheel 13 is arranged in its axial direction on a second side of the bracket 20, which second side lies opposite the first side and faces the engine housing 2. As a result, the installation space requirement can be kept particularly low. In particular, the bracket 20 is held on the engine housing 2 in a reversibly releasable manner, with the result that the internal combustion engine 1 can be equipped in an appropriate way with the auxiliary drive.

Here, the bracket 20 has at least one carrying arm 24 which penetrates a through opening 25 which is formed by way of the belt 14 and a through opening 26 which is formed by way of the belt 15. Therefore, starting from the engine housing 2, the bracket 20 extends through the through openings 25 and 26 to the pulley wheel 13 or the shaft 22.

Moreover, the internal combustion engine 1 has an auxiliary unit in the form of an electric machine 27 which can be driven by the output shaft via the belt 10 and the pulley wheel 9. To this end, the electric machine 27 has a rotor which is connected fixedly to a wraparound wheel in the form of a pulley wheel 28 so as to rotate with it, or can be driven by the pulley wheel 28. Here, the belt 10 wraps around the pulley wheel 28 at least partially, with the result that the rotor and therefore the electric machine 27 can be driven by the output shaft via the pulley wheel 28, the belt 10 and the pulley wheel 9. Therefore, the electric machine 27 can be driven by the output shaft via the basic drive. The electric machine 27 is, for example, a generator which is also called an alternator.

The internal combustion engine 1 comprises a further auxiliary unit in the form of an air conditioning compressor 29. By means of the air conditioning compressor 29, for example, a refrigerant of an air conditioning system of the motor vehicle can be conveyed and compressed. Here, the air conditioning compressor 29 can be driven by the output shaft via the basic drive. The air conditioning compressor 29 has, for example, a further pump element (cannot be seen in the figures) for conveying and compressing the refrigerant. The pump element can be driven, for example, by a further shaft of the air conditioning compressor 29 and, in particular, is connected fixedly to the further shaft so as to rotate with it. Moreover, the further shaft can be driven by a wraparound wheel in the form of a pulley wheel 30, the further shaft, for example, being connected fixedly to the pulley wheel 30 so as to rotate with it. Here, the belt 10 wraps around the pulley wheel 30 at least partially, with the result that the basic drive also comprises the pulley wheels 28 and 30. The air conditioning compressor 29 can therefore be driven by the output shaft via the pulley wheel 30, the belt 10 and the pulley wheel 9, in order to convey the refrigerant as a result.

As an alternative to the fixed coupling of the pump element to the pulley wheel 30 so as to rotate with it, in particular via the further shaft, a coupling device can be provided which can be switched over, for example, between a released state and a locked state. In the locked state, the further pump element of the air conditioning compressor 29 is coupled to the pulley wheel 30 via the coupling device and can therefore be driven by the pulley wheel 30. In the released state, however, the further pump element of the air conditioning compressor 29 is decoupled from the pulley wheel 30, with the result that the further pump element and therefore the air conditioning compressor 29 overall are not driven by the output shaft. As a result, appropriate switching on and off of the air conditioning compressor 29 can be realized.

It is preferably provided that, for example, the pulley wheel 12 has at least one turret tensioning system for tensioning the belt 14 and/or for tensioning the belt 15. As an alternative or in addition, it is conceivable that, for example, the pulley wheel 13 has a turret tensioning system for tensioning the belt 15.

Since, in the case of the first embodiment which is shown in FIGS. 1 to 7, both the belt 14 and the belt 15 wrap around the pulley wheel 12 at least partially, the pulley wheel 12 is configured, for example, as a double pulley wheel. Furthermore, for example, the pulley wheel 9 is configured as a double pulley wheel, since both the belt 14 and the belt 10 wrap around the pulley wheel 9. Here, for example, the wraparound regions 16 and 17 are configured in one piece with one another or are connected fixedly to one another so as to rotate together. As an alternative or in addition, the wraparound regions 18 and 19 can be configured in one piece with one another or can be connected fixedly to one another so as to rotate together.

In the case of the exemplary embodiment which is illustrated in FIGS. 1 to 7, the pulley wheel 12 has a turret tensioning system for tensioning the belt 15. The turret tensioning system has, for example, a drive wheel and a hub component. The wraparound region 19 is formed, for example, by way of the drive wheel, the drive wheel being connected fixedly to the hub component so as to rotate with it in the completely produced state of the internal combustion engine 1. In order for a preassembled state to be realized, for example, the drive wheel is arranged on the hub component, the drive wheel being, for example, connected fixedly to the hub component so as to rotate with it in the preassembled state, but it still being possible in the preassembled state for the drive wheel to be displaced overall relative to the hub component in its radial direction and in the radial direction of the hub component or the pulley wheel 12.

For example, in the preassembled state, the belt 15 is mounted on the drive wheel, by the belt 15 wrapping around the drive wheel at least partially. If, for example, the drive wheel which is arranged eccentrically with respect to the hub component in the preassembled state is then displaced relative to the hub component in the radial direction of the drive wheel and of the hub component, in particular in such a way that the drive wheel is oriented coaxially with respect to the hub component, the belt 15 is tensioned as a result and the drive wheel is moved into a final assembled position. In the final assembled position, in which the belt 15 is tensioned in the described way and the drive wheel is arranged coaxially with respect to the hub component, the drive wheel is secured on the hub component, with the result that undesired relative displacements between the drive wheel and the hub component in the radial direction of the pulley wheel 12 are avoided. To this end, for example, the drive wheel is screwed to the hub component.

In order to tension the belt 15 in a particularly simple manner, the drive wheel and, with it, the hub component are rotated, for example, by 180° relative to the engine housing 2 starting from the preassembled state, as a result of which the drive wheel is arranged coaxially with respect to the hub component and the belt 15 is tensioned.

Figure 8:
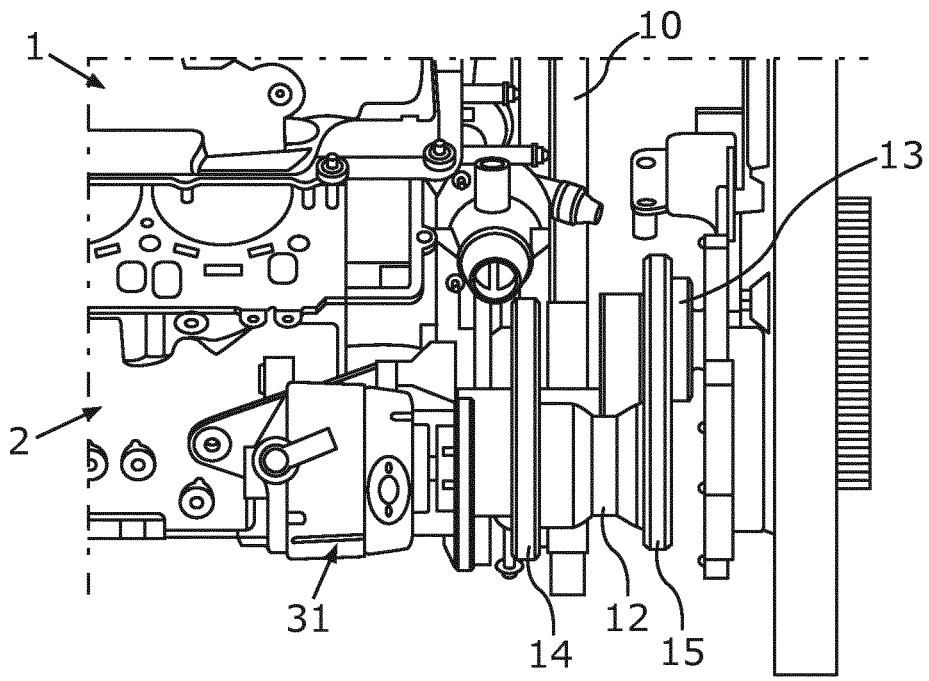
FIG. 8 shows details of a diagrammatic and perspective side view of the internal combustion engine in accordance with a second embodiment.
Figure 9:
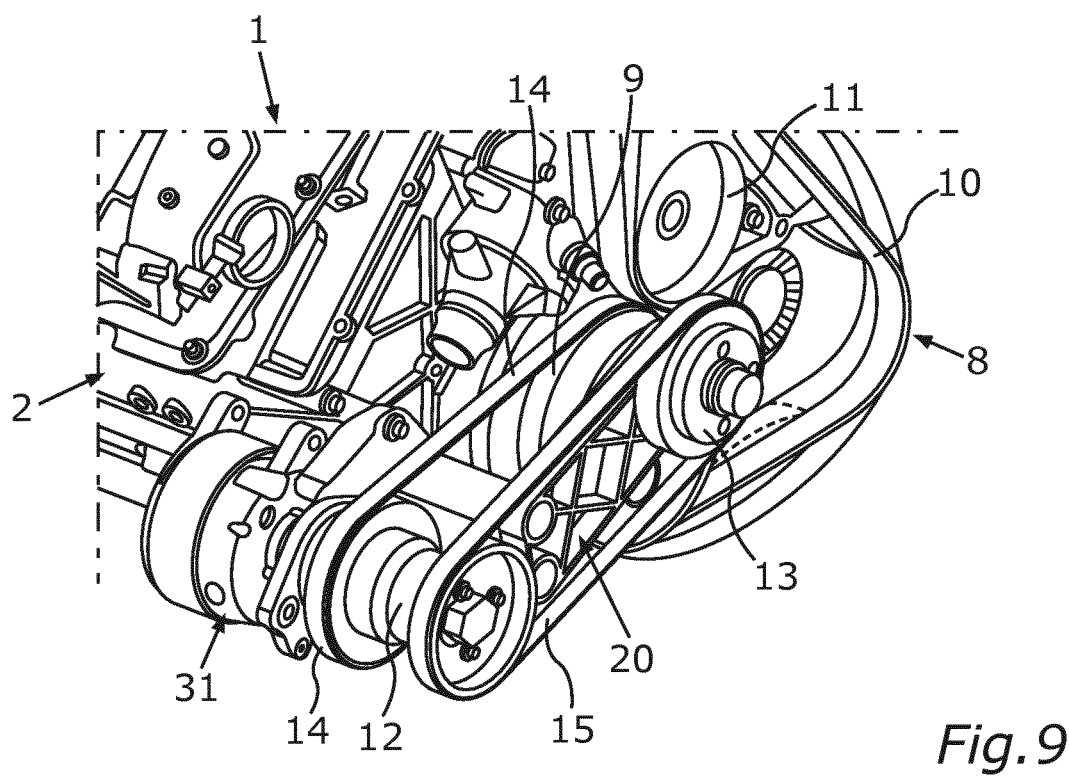
FIG. 9 shows details of a diagrammatic and perspective front view of the internal combustion engine in accordance with the second embodiment.

FIGS. 8 and 9 show a second embodiment of the internal combustion engine 1. In particular, the second embodiment differs from the first embodiment in that a further auxiliary unit in the form of a liquid pump 31 is provided. The liquid pump 31 is a hydraulic pump, by means of which a hydraulic liquid can be conveyed, for example for operating at least one hydraulically operable actuator, in particular a transmission of the motor vehicle. Here, the liquid pump 31 is held on the bracket 20 and can be driven by the pulley wheel 12.

This means that the liquid pump 31 can be driven or is driven by the output shaft via the pulley wheel 12, the belt 14 and the pulley wheel 9.

The liquid pump 31 (hydraulic pump) preferably has an integrated clutch which is preferably configured as a positively locking clutch and here, for example, as a dog clutch. The liquid pump 31 has, for example, a third pump element which can be driven by the pulley wheel 12 for conveying the hydraulic liquid. Here, the clutch can be switched over, for example, between a coupling state and a decoupling state. In the coupling state, the third pump element of the liquid pump 31 is connected via the clutch to the pulley wheel 12 and can therefore be driven by the pulley wheel 12 via the clutch. In the decoupling state, however, the third pump element is decoupled from the pulley wheel 12 and therefore cannot be driven by the pulley wheel 12 via the clutch, as a result of which the liquid pump 31 can be switched on and off appropriately. It can be seen particularly clearly from FIGS. 8 and 9 that the liquid pump 31 can be integrated by way of the above-described building block character, which integration is particularly simple, inexpensive and favorable in terms of installation space, and can be driven advantageously here via the auxiliary drive. It is therefore possible, in particular, for a building block character to be realized, within the context of which the internal combustion engine 1 can be equipped in a simple way with the liquid pump 31, or the liquid pump 31 can be dispensed with simply, without the basic drive or auxiliary drive being influenced structurally. Furthermore, the liquid pump which is also called a hydraulic pump can be driven without transverse forces via the auxiliary drive and, in particular, via the clutch.

LIST OF REFERENCE CHARACTERS

1 Internal combustion engine
2 Engine housing
3 Cylinder head
4 Cylinder head
5 Fan
6 Fan impeller
7 Coolant pump
8 Wraparound drive
9 Pulley wheel
10 Belt
11 Pulley wheel
12 Pulley wheel
13 Pulley wheel
14 Belt
15 Belt
16 Wraparound region
17 Wraparound region
18 Wraparound region
19 Wraparound region
20 Bracket
21 Screw
22 Shaft
23 Receptacle
24 Carrying arm
25 Through opening
26 Through opening
27 Electric machine
28 Pulley wheel
29 Air conditioning compressor
30 Pulley wheel
31 Hydraulic pump The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine for a motor vehicle, comprising:
   an output shaft;
   a fan;
   a first auxiliary unit, wherein the first auxiliary unit is a coolant pump;
   a wraparound drive which has:
   a first wraparound wheel which is drivable by the output shaft;
   a first wraparound means which wraps around the first wraparound wheel, which is drivable by the output shaft via the first wraparound wheel, and via which the coolant pump is drivable by the output shaft;
   a second wraparound wheel;
   a third wraparound wheel;
   a second wraparound means which wraps around the first wraparound wheel and the second wraparound wheel and wherein the second wraparound wheel is drivable by the output shaft via the second wraparound means and the first wraparound wheel;
   a third wraparound means which only wraps around the second wraparound wheel and the third wraparound wheel and does not wrap around the first wraparound wheel such that the fan is drivable by the second wraparound wheel via the third wraparound wheel and the third wraparound means, and
   a bracket which is held on a housing element of the internal combustion engine, wherein the second wraparound wheel, the third wraparound wheel, and the fan are held rotatably on the bracket and wherein only the fan is drivable by the third wraparound wheel and the third wraparound means.

2. The internal combustion engine according to claim 1, wherein the bracket has a carrying arm on which the third wraparound wheel is held rotatably, wherein the carrying arm penetrates a first through opening defined by the second wraparound means and a second through opening defined by the third wraparound means.

3. The internal combustion engine according to claim 1 further comprising a second auxiliary unit which is different than the first auxiliary unit and the fan, wherein the second auxiliary unit is drivable by the second wraparound wheel.

4. The internal combustion engine according to claim 3, wherein the second auxiliary unit is held on the bracket.

5. The internal combustion engine according to claim 3, wherein the second auxiliary unit is a liquid pump.

6. The internal combustion engine according to claim 3 further comprising a third auxiliary unit, wherein the third auxiliary unit is drivable by the output shaft via the first wraparound means and the first wraparound wheel.

7. The internal combustion engine according to claim 6, wherein the third auxiliary unit is an electric machine.

8. The internal combustion engine according to claim 1, wherein the second wraparound wheel and/or the third wraparound wheel has a respective turret tensioning means.

9. The internal combustion engine according to claim 1, wherein the first wraparound means is disposed in a first plane, the second wraparound means is disposed in a second plane which is spaced apart from the first plane, and the third wraparound means is disposed in a third plane which is spaced apart from the first plane and from the second plane, and wherein the first plane runs at least partially between the second plane and the third plane.

10. The internal combustion engine according to claim 1, wherein the coolant pump is a cooling liquid pump.

\* \* \* \* \*